United States Patent [19]
Curtin, IV et al.

[11] Patent Number: 5,924,803
[45] Date of Patent: Jul. 20, 1999

[54] DATA INPUT DEVICE USING COMBINED NUMERIC INPUTS TO ENCODE CHARACTERS

[75] Inventors: William J. Curtin, IV; William J. Curtin, II, both of Madison; Charles W. Mortell, Appleton, all of Wis.

[73] Assignee: American Tel-A-System, Inc., McFarland, Wis.

[21] Appl. No.: 09/047,351

[22] Filed: Mar. 25, 1998

[51] Int. Cl.$^6$ .......................................................... B41J 5/06
[52] U.S. Cl. .............................. 400/100; 345/168; 341/22
[58] Field of Search .............................. 400/100; 341/22; 455/403; 345/168, 169, 172; 340/337; 235/156

[56] References Cited

U.S. PATENT DOCUMENTS

| | | | |
|---|---|---|---|
| 3,833,765 | 9/1974 | Hilborn et al. ............................. | 178/79 |
| 4,009,379 | 2/1977 | Munsh ..................................... | 235/156 |
| 4,037,092 | 7/1977 | Osborne et al. ......................... | 235/156 |
| 4,124,843 | 11/1978 | Bramson et al. ........................ | 340/337 |
| 5,500,643 | 3/1996 | Grant ....................................... | 341/22 |
| 5,729,221 | 3/1998 | Krolopp et al. .......................... | 341/22 |
| 5,828,323 | 10/1998 | Baret ....................................... | 341/22 |

*Primary Examiner*—Edgar Burr
*Assistant Examiner*—Charles H. Nolan, Jr.
*Attorney, Agent, or Firm*—Antonelli, Terry, Stout & Kraus, LLP

[57] ABSTRACT

The invention is a system for encoding inputs and methods of operation thereof. The inventions includes a plurality of inputs each displaying a different numerical value with at least some of the plurality of inputs each also displaying at least one input letter and at least one additional input each displaying at least one input not representing a numerical value or letter, each of the plurality of inputs displaying an input numerical value when selected singularity producing a signal representing selection of the displayed numerical input value and each additional input when selected producing a signal representing the input selection of the displayed at least one input, different ones of the plurality of inputs displaying a numerical input value further being selected to input consonants and vowels with an input vowel being selected and inputted with one input displaying an input numerical value and another input displaying an input numerical value and the input vowel with an input consonant being selected with one input displaying an input numerical value and another input displaying an input numerical value and the selected input consonant and an input other than a numerical value or letter being selected with one input being one of the at least one additional inputs and another input which is one of the plurality of inputs; and an encoder, responsive to the plurality of inputs and to the at least one additional input, having an output for outputting encoded inputs including at least alphabetical and numerical characters with each selected numerical value being inputted to the encoder in response to selection of a single one of the plurality of inputs displaying a numerical value and all inputs, other than numerical values, being inputted to the encoder in response to the combined selection of inputs chosen from the plurality of inputs and the at least one additional input.

29 Claims, 5 Drawing Sheets

FIG. 3

| A | B | C | D | E |
|---|---|---|---|---|
| 0 1 | 7 1 | 7 2 | 7 3 | 0 2 |

| F | G | H | I | J |
|---|---|---|---|---|
| 7 4 | 7 5 | 8 1 | 0 3 | 8 2 |

| K | L | M | N | O |
|---|---|---|---|---|
| 8 3 | 6 4 | 8 4 | 6 5 | 0 4 |

| P | Q | R | S | T |
|---|---|---|---|---|
| 8 5 | 9 1 | 8 1 | 6 2 | 8 3 |

| U | V | W | X | Y |
|---|---|---|---|---|
| 0 5 | 9 2 | 9 3 | 9 4 | 9 5 |

| Z | Space | Period | Back Space | Comma |
|---|---|---|---|---|
| 9 6 | 0 . | . | . 1 | . 4 |

| Return / Enter | Return (Alternate) | : | ; | ' |
|---|---|---|---|---|
| | 0 9 | . 2 | . 3 | . 8 |

| / | \ | Under-score | ? | ! |
|---|---|---|---|---|
| 7 + | 9 + | 4 + | . 5 | . 6 |

| " | ( | ) | ~ | Dash |
|---|---|---|---|---|
| . 9 | 5 + | 6 + | 1 + | 2 + |

| Phantom Shift | | Caps Lock | $ | = |
|---|---|---|---|---|
| . 7 | | 7 8 | 8 9 | 3 + |

| Tab | Esc | Alt | Ctrl | @ |
|---|---|---|---|---|
| 0 7 | 7 9 | 0 8 | 6 7 | 8 + |

| Ctrl+ALT+Del | Num Lock |
|---|---|
| 6 8 | + . |

DATA INPUT DEVICE USING COMBINED NUMERIC INPUTS TO ENCODE CHARACTERS

TECHNICAL FIELD

The invention relates to data input devices and, more particularly, to data input devices which efficiently input character data including alphanumerical characters, such as to a data processing device, without requiring an alphanumeric keyboard and to enabling devices only having numeric and auxiliary inputs to input data, including alphanumerical characters, to data processing devices.

BACKGROUND ART

It is known that data may be inputted to data processing devices by the use of keyboards having a plurality of input keys, with each key corresponding to a particular data element such as an alphanumeric character. A typical configuration of such a keyboard is known as a "QWERTY" configuration, wherein the first keys on one of the keyboard rows respectively represent the alphabetic characters Q, W, E, R, T and Y. However, such keyboards require a large number of keys and associated switches, and thus require a large amount of space, interfering with true portability and simplicity of construction.

Data input devices are also well-known which sense the position of a stylus contacting the face of a display device which permit the input of data to a data processing device without a keyboard. The touching and actual path of the stylus across the face of the display device is interpreted by a processor associated with the display device to provide data entry which permits a user to handwrite or select displayed data inputs. One form of these devices is known as a personal digital assistant (PDA).

U.S. Pat. No. 4,381,502 discloses the encoding of alphanumeric characters by a sequential depressing of keys in which a first key is not released until a second key is depressed. The encoding of letters is produced by depressing the key which is marked with the letter to be encoded as the second key in the sequence. This process is disadvantageous because it requires each of the keys to depict numerous letters or characters which makes use of the keyboard potentially confusing and complex. Furthermore, the order of input of the keystrokes determines the character which is selected (i.e. a 0–1 sequence inputs a different character than a 1–0 sequence which makes the input sequence susceptible to operator error).

U.S. Pat. No. 4,042,777 discloses a keyboard which generates specific characters by the combined selection of several keys.

U.S. Pat. No. 5,493,658 discloses a keyboard which is marketed as a BAT keyboard by Infogrip Inc. of Ventura, Calif. The keyboard of the '658 Patent utilizes a five key configuration intended for use by the blind. This keyboard utilizes the combined selection of keys to input information.

DISCLOSURE OF INVENTION

The present invention is a system and method for inputting and/or encoding information including, but not limited to non-numerical characters, such as alphabetical letters and punctuation, and commands by combined selection of pairs of displayed inputs with one input displaying a numerical value and another input displaying at least the inputted information. A plurality of displayed auxiliary inputs which do not display numbers or letters are further used in the combined selection of pairs of inputs to input non-numerical inputs or commands. The implementation of the display from which the pair of inputs are selected may be either in the form of an actual keypad in which the fingers of the user move the keys to select the input, as is done with conventional typing, or with a display representing the data of a numerical keypad such as, but not limited to, an LCD of a PDA. When a display device is used, known processing techniques are used to interpret motion of a stylus or other instrument across the face of the display device between a pair of the displayed inputs as selection of the inputs.

With the invention, the order of selection of the pairs of inputs is not material to the selection of an input which is unlike U.S. Pat. No. 4,381,502. The invention facilitates fast selection inputting and encoding of numbers, letters, other symbols and commands with the selection of only a pair of inputs while eliminating the order of selection of the pair of inputs as a variable in the process.

The invention provides a simplified and efficient mechanism for inputting numbers, letters or other symbols, such as punctuation and commands, which uses displayed inputs, which may be without limitation individual keys within a standard numeric keypad or a display of a display device, such as a PDA. The display of each input includes a numerical value and additionally may display one or more input consonants, one or more input vowels or other input non-numerical and input non-letter characters, such as punctuation. When a numeric keypad is used to practice the invention, individual numeric keys are each associated with a switch, which upon depressing of the key, generates a signal which is read by any well-known mechanism for detecting individual keystrokes of the keypad. With a display of the inputs of a numeric keypad, such as with a PDA, the sensing of movement across the display between a pair of the displayed inputs completes the inputting process. It should be understood that the movement of the stylus between inputs may pass through intermediate inputs with only the beginning and ending input positions being sensed to determine the combined selection of a pair of inputs for selecting the desired input letter, symbol, character or command.

With the invention, numerical inputs are selected sequentially one numerical input at a time and displayed non-numerical inputs of vowels and consonants, are selected by the combined selection of at least a pair of displayed inputs, including one input displaying preferably only a numerical value and another input displaying a numerical value and one or more vowels or another input displaying a numerical value and one or more consonants. Finally, characters which are neither consonants or vowels, such as punctuation and computer command key equivalents, are selected by the combined selection of inputs with one input displaying the selected input non-vowel, non-consonant character and another input displaying only a numerical value. As used herein, the term "combined selection of inputs" in a keypad implementation of the invention means that both inputs are selected at least with an overlap in time but may without limitation be simultaneous with both inputs being selected at the same time and released at the same time and in a display device implementation means that a stylus or other implement is moved across a face of the display device between the inputs representing the beginning and ending of motion of the stylus or implement. Thus, in accordance with the invention, precision in the timing of the selection of inputs in a keypad implementation of the invention or with a display device is not dependent upon manual dexterity. All that is necessary with a keypad is that a logical ANDing of the two selected inputs be present for a time interval sufficient to permit electronic detection thereof with known sensing techniques. With a display device using position sensing technology of the motion of a stylus or implement across a display, all that is necessary is that the user manipulate the stylus or implement to begin and end a path of travel at two selected position inputs which encode the input.

A system for encoding inputs in accordance with the invention includes a plurality of inputs each displaying a different numerical value with at least some of the plurality of inputs each also displaying at least one input letter and at least one additional input each displaying at least one input not representing a numerical value or letter, each of the plurality of inputs displaying a numerical value when selected singly producing a signal representing selection of a displayed numerical input value, and each additional input when selected producing a signal representing selection of the displayed at least one input, different ones of the plurality of inputs displaying a numerical value further being selected in combination to input consonants and vowels with a vowel being selected with one input displaying a numerical value and another input displaying a numerical value and the selected vowel and with a consonant being selected with one input displaying a numerical value and another input displaying a numerical value and the selected consonant and an input other than a letter being selected with one input being one of the at least one additional input and another input which is one of the plurality of inputs; and an encoder, responsive to the plurality of inputs and to the at least one additional input, having an output for outputting the encoded inputs, including at least alphabetical and numerical characters, with each selected numerical value being inputted to the encoder in response to selection of a single one of the plurality of inputs displaying a numerical value and all inputs other than numerical values being inputted to the encoder in response to the combined selection of inputs chosen from the plurality of inputs and the at least one additional input. Preferably, one of the inputs selected with the inputting of vowels and consonants displays only a numerical value. One of the plurality of inputs displaying a numerical value also displays each of the vowels and a plurality of inputs displaying a numerical value each also displays a plurality of different consonants. Inputs other than numbers, vowels and consonants including commands, are each inputted by a combined pair of inputs with one of the pair of inputs displaying a character other than a number or letter.

Certain characters are selected by additional selection actions of either the numerical keypad or display device. The letter Z may be selected by a pair of inputs each displaying a numerical value and at least one consonant. In a preferred embodiment, only one case (e.g. capital or small) of a letter is displayed with the keyboard or display device, in which event the selection of a single letter of the other case is produced by a special command, such as a "phantom shift", using one auxiliary input of a key or display not displaying a number or letter (e.g., a period) and a numerical input or from a key or display. The conversion of the whole set of letters displayed as one case (e.g. capital or small) for selection as the other case is produced by a special command, such as "caps lock", followed by the combined selection of the pairs of inputs to select any of the letters for which inputting of the other case is desired.

The display of the inputs may have diverse configurations. When a keyboard is used, the plurality of inputs are preferably disposed in a single in-line array to permit both hands to be used simultaneously as with conventional typing. This configuration is believed to be the fastest to learn and the fastest configuration to operate. Alternatively, the keyboard configuration may be identical to a conventional keypad having the plurality of inputs located in two pairs of vertical columns spaced on each side of a centerline with a plurality of the inputs displaying a numerical value and at least one consonant being displayed in at least two of the columns respectively on different sides of a centerline of the vertical columns.

A method of selecting inputs with a plurality of inputs each displaying a different numerical value with at least some of the plurality of inputs each additionally displaying at least one input letter and at least one additional input each displaying at least one character not representing a numerical value or letter in accordance with the invention, includes selecting a different numerical value displayed on one of the plurality of inputs by individual selection of the input displaying the different numerical value; combined selecting of at least one vowel with one input displaying a numerical value and another input displaying a numerical value and the vowel; and combined selecting of at least one consonant with one input displaying a numerical value and another input displaying a numerical value and the selected consonant.

Preferably, one of the inputs selected with the inputting of vowels and consonants displays only a numerical value. One of the plurality of inputs each displaying a numerical value also displays a plurality of vowels and a plurality of the plurality of inputs each displaying a different numerical value each displays a plurality of different consonants. The invention includes further selecting at least one character or command, which is neither, a consonant nor a vowel, by combined selecting of a plurality of inputs chosen from the plurality of inputs and the at least one additional input.

BRIEF DESCRIPTION OF THE DRAWINGS

FIG. 3 is a table representing how selected inputs of numerical values and non-numerical inputs including characters and commands are inputted in accordance with the embodiments of FIGS. 1 and 2.

Like reference numerals identify like parts throughout the drawings.

BEST MODE FOR CARRYING OUT THE INVENTION

Figure 1:
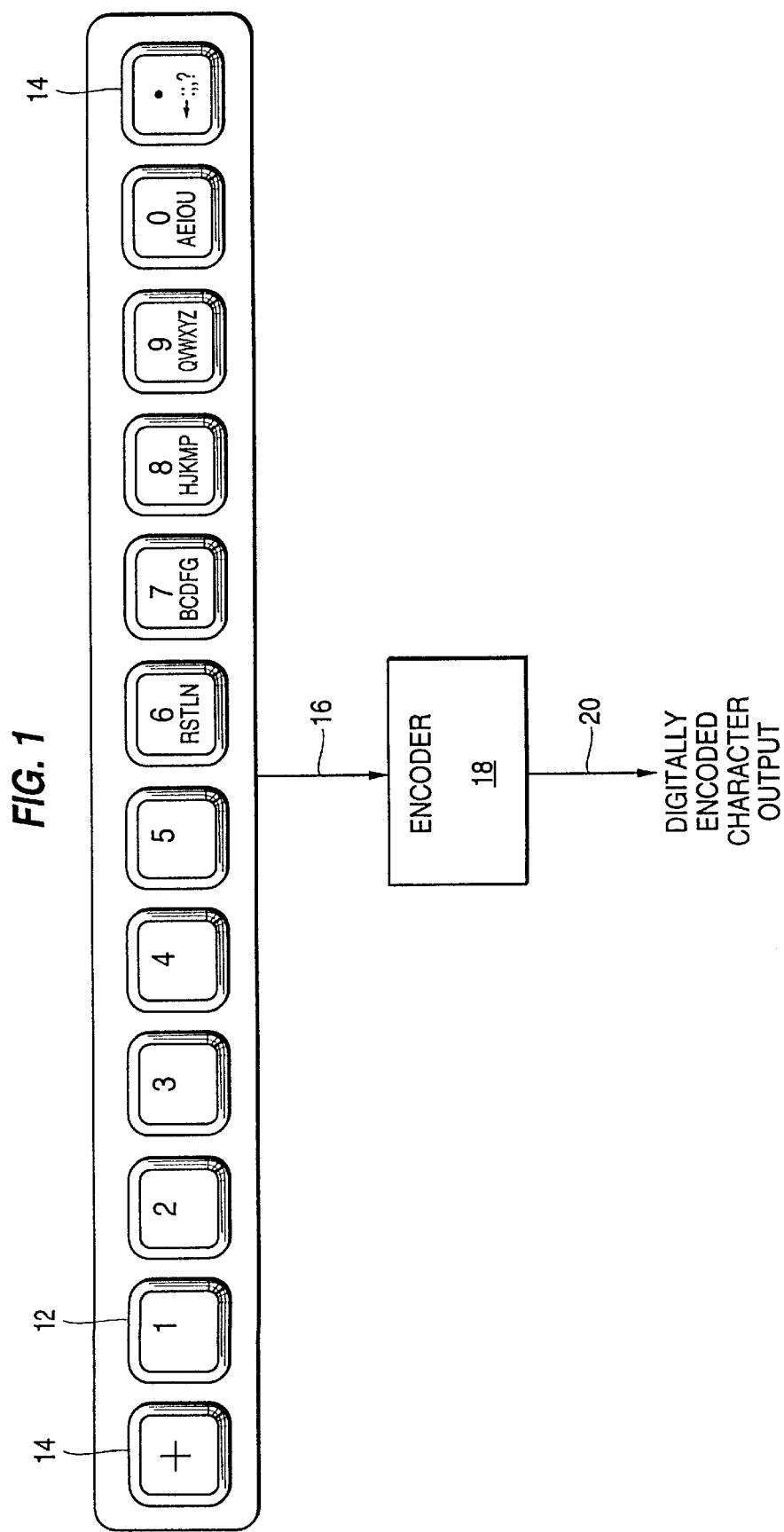
FIG. 1 illustrates a first embodiment of the invention which utilizes an in-line keyboard or display for the selection of non-numerical inputs by a combined selection of inputs.

FIG. 1 illustrates a first embodiment 10 of tpr present invention. The first embodiment has a plurality of numerical inputs 12. A first group of the numerical inputs 12 only display a number value (e.g. numerical inputs 1–5). A second group of the numerical inputs displays a number and a group of letters in the form of five consonants (e.g. numerical inputs 6–9) or five vowels (e.g. numerical input 0). Additionally, at least two auxiliary inputs 14 provide auxiliary inputs and do not display a number or letter. However, it should be understood that the invention is not limited to the illustrated number of inputs 12 and 14 or to the content of the display of the groups of letters. For example, the placement of the "0" display may be moved from the right edge to another position to the left thereof in order to provide relief from frequent physically fatiguing use of the small finger which, in the illustrated display, makes a large number of strokes because of the common use of vowels. The inputs 12 and 14 may be keys on a keyboard or the display of a display device, such as a PDA, in which inputs are selected by a stylus or other device. The hardware associated with a keyboard implementation (e.g. switches, etc.) and processing associated with the position sensing display device is well known, is not part of the present invention, is not illustrated, and should be understood as being associated with the first embodiment. The output 16 of the keypad or display device outputs either single or pairs of signals respectively representing selection of either a single numerical value represented by inputs 12 or the auxiliary inputs 14 or the combined selection of a pair of numerical inputs as described below to output selected non-numerical outputs 20. The single or combined output signals on output 16 are processed in accordance with the table of FIG. 3, as described below by encoder 18, to produce an encoded multiple bit output signal 20 such as, but not limited to, ASCII. The encoder 18 may be a separate device for connection between the keypad or display of in FIG. 1 and another device connected to the character output 20 such as, but not limited to, a PC. In this embodiment, the encoder 18 may contain firmware, a programmed logic array, a programmed microprocessor or a combination of these elements, to translate individual signals and pairs of signals on output 16 representing combined selection of numerical input keys 12 and 14, into the multibit output representing selections in accordance with the table of FIG. 3 as described below. It should be understood that if a keypad is used with the embodiment of FIG. 1, the reading and interpretation of individual closings of the switches associated with the numerical and auxiliary inputs 12 and 14 is well known in the art with the present invention being practiced in a keyboard implementation with any known configuration of sensing devices for detecting either individual closing of switches or combined closings of switches to produce the output 16 which is processed by the encoder 18 into the output 20 which may be, but is not limited to ASCII format. In a preferred form of the present invention, the encoder 18 may be microprocessor based but the invention is not limited thereto.

The embodiment 10 provides a simplified and inexpensive inputting device for alphanumeric data as well as functions associated with a calculator or a position sensing display device, such as a PDA. In a preferred embodiment, as illustrated in FIG. 1, the encoder 18 may be an interface between the keyboard, including the numeric keypad, and a PC (not illustrated) and may use logic in the form of firmware to convert the combined keystrokes into the encoded character output 20. The second embodiment 100 has four columns of keys which are disposed on both sides of a vertical centerline 24 and has a configuration identical to a numerical keypad, such as used with a keypad of a word processor, but has the advantage of eliminating the additional keys which add weigh, cost and complexity to a standard word processor keyboard. This configuration of keys 12 and 14 has the benefit of the keypad layout of the standard numeric keypad which may be operated with a single hand or two hands with the finger type of each hand facing the finger type of the other hand. Moreover, the additional number of keys 14 in the embodiment 100 of FIG. 2 beyond those available in the embodiment 10 of FIG. 1 permits additional characters and/or command to be selected. If the second embodiment 100 is implemented as a keypad as illustrated, individual electrical connections of the output 16 will include electrical switches 16' as illustrated or equivalent electrical devices to complete the output electrical connection caused by the depressing of individual keys. However, the illustrated switches would not be used if a display device is used with the processing of the display providing the necessary electrical signals to the encoder 18.

The individual keys or displays 12 and 14 of embodiments 10 and 100 are utilized for different purposes. The inputting of numbers 0–9 is accomplished by depressing individual inputs 12 or touching them with a stylus or other input. The selection of individual non-numeric characters, including letters, punctuation, commands and auxiliary inputs displayed on the top of the inputs 12 and 14, is performed by the combined selection of two inputs in accordance with a selection table as set forth in detail in FIG. 3. The combined selection of two inputs 12 and 14 is performed by simultaneous or overlapping (ANDing) depressing of pairs of selected keys 14 if a keyboard is used and is performed by movement of a stylus or other instrument between beginning and ending displayed inputs of the display device in accordance with the selection table of FIG. 3. The letter "A" is selected with pairs of keystrokes of the keys labelled "0" and "1" or by movement of a stylus or other implement between the inputs bearing the numerical values "0" and "1". The order of movement (e.g. from "0" to "1" or from "1" to "0") is immaterial and passage through any other intermediate displays between the "0" and the "1" is also immaterial. Intermediate motion of the stylus through other inputs is not interpreted as part of the selection of combined inputs with only the final combined selection being completed when the stylus is lifted from touching the display at the end of movement in contact with the last of inputs 12 and 14 to be touched or contacted.

As may be seen, the display of FIG. 1 contains a total of only twelve inputs which select different inputs including the inputting of numbers, letters, and punctuation. These inputs, upon selection, permit a numeric keyboard construction or position sensing display to be used as part of an input of alphanumeric letters and other symbols to a PC as well as the entry of numbers and processing thereof.

Figure 2:
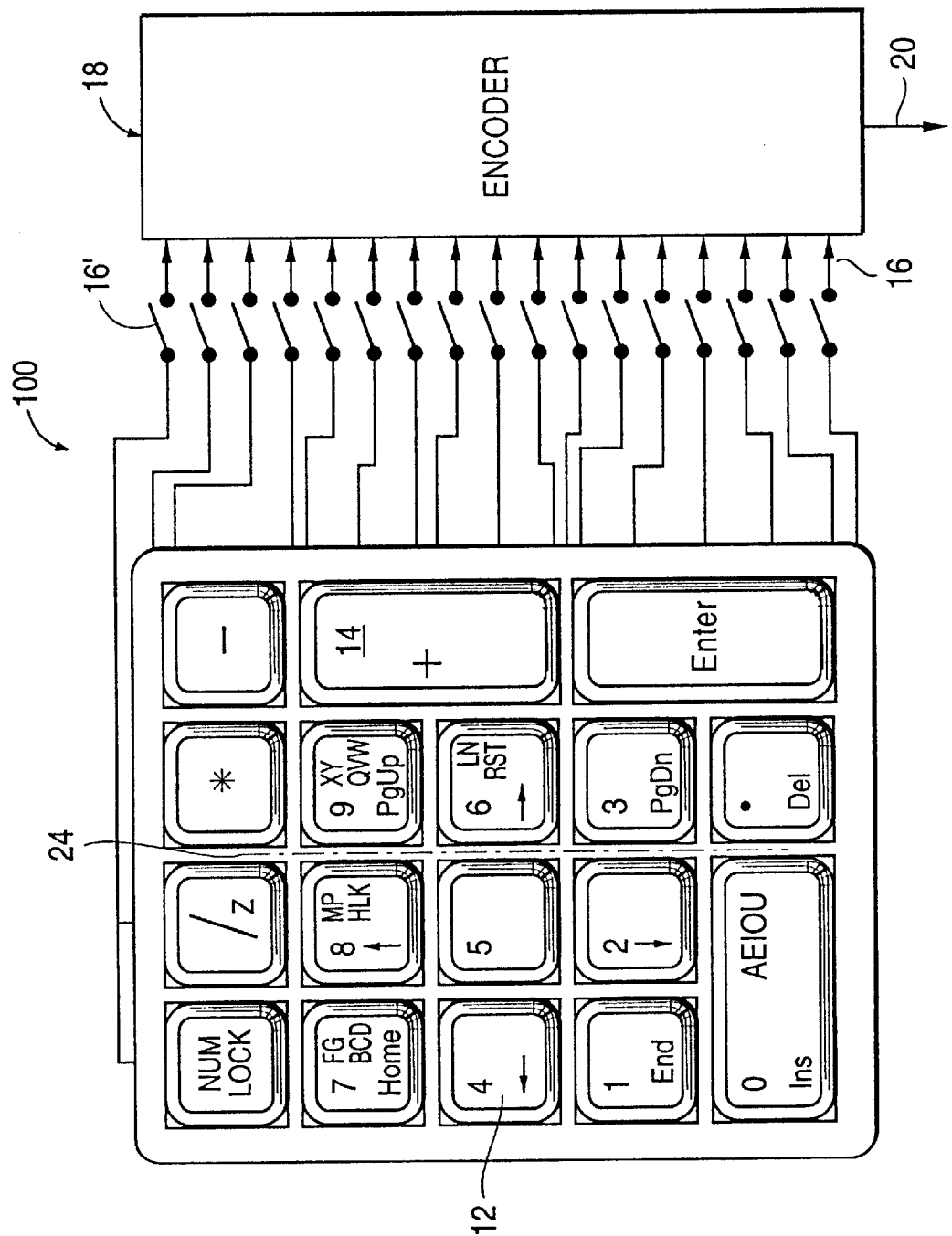
FIG. 2 is a diagram of a second embodiment of the invention using a configuration of inputs in vertical columns identical to a standard numerical keypad for the selection of non-numerical inputs by a combined selection of inputs.

FIG. 3 illustrates a table containing a preferred combined selection algorithm of the embodiments of FIGS. 1 and 2 which uses the combined selection of pairs of selected inputs to select the illustrated characters or commands. Each of the characters are selected by either the combined selection of two keys with one key displaying a number and another key also displaying the selected letter or punctuation or the movement of a stylus or other device on a position sensing display between the numerical and auxiliary inputs of FIG. 3. For example, the letter "A", as seen from the displayed information for each of the inputs of FIGS. 1 and 2, is selected with the combined selection of the input 12 labelled "0" which is also labelled with all of the vowels a, e, i, o and u and the number "1". Similarly, the letter "B" is selected with the numerical inputs 12 displaying the number "7" and the number "1".

The selection of the case of letters is performed in two ways. Individual opposite case letters are selected by the "Phantom Shift" inputs "0.7" followed by the selected combination of inputs designating the selected letter as set forth in FIG. 3. A sequence of opposite case letters is performed by the "Caps Lock" inputs "78" followed by the sequence of letters individually selected by combinations of pairs of inputs for each letter as set forth in FIG. 3.

Each of the embodiments of the present invention preferably utilizes an encoder 18 which interprets either keystrokes or stylus motion across a position sensing display displaying the content of FIGS. 1 and 2 in accordance with FIG. 3 to produce the output 20.

Figure 4:
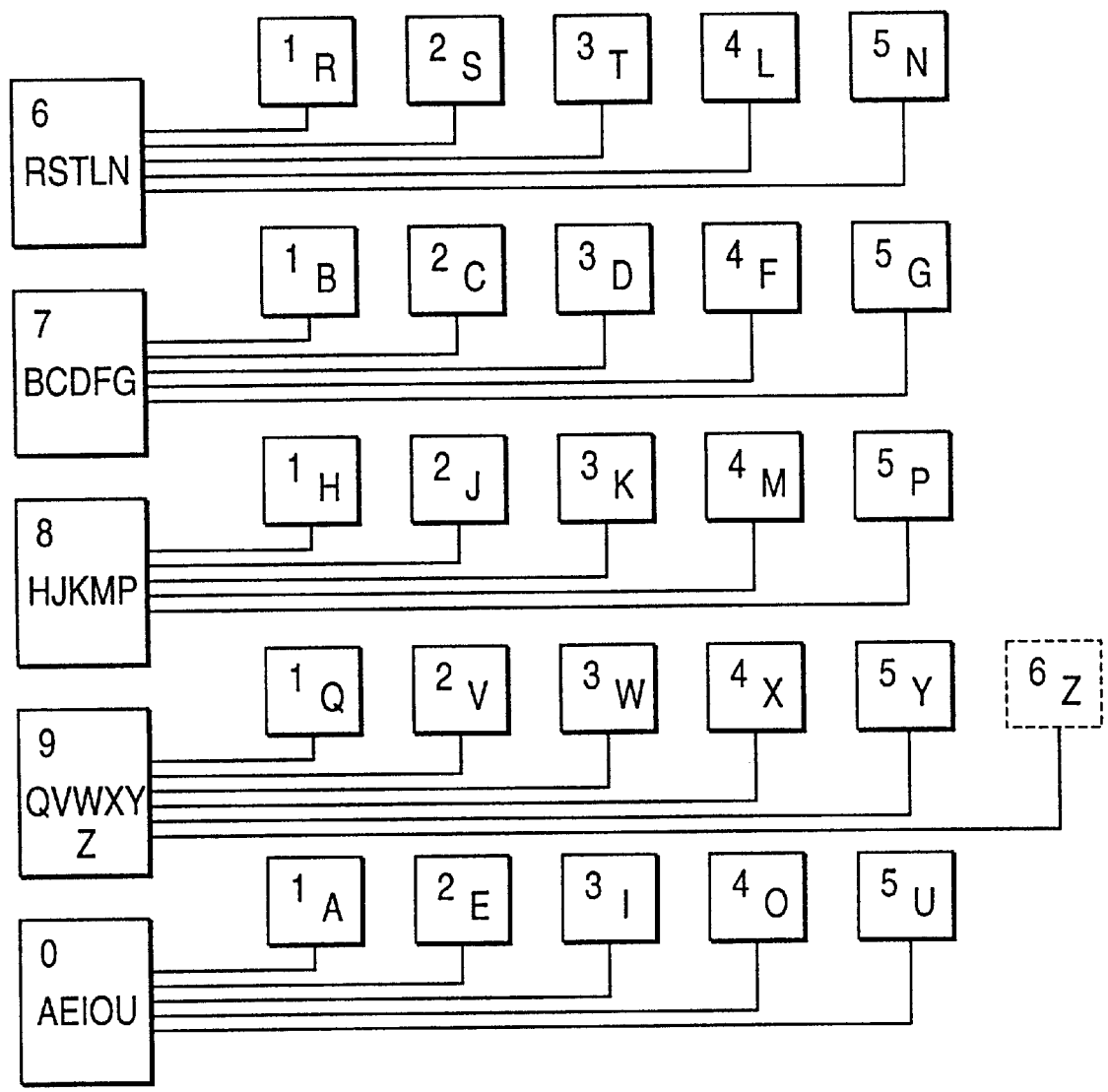
FIGS. 4 and 5 each illustrate how letters are inputted from a selected pair of display inputs in accordance with the table of FIG. 3.
Figure 5:
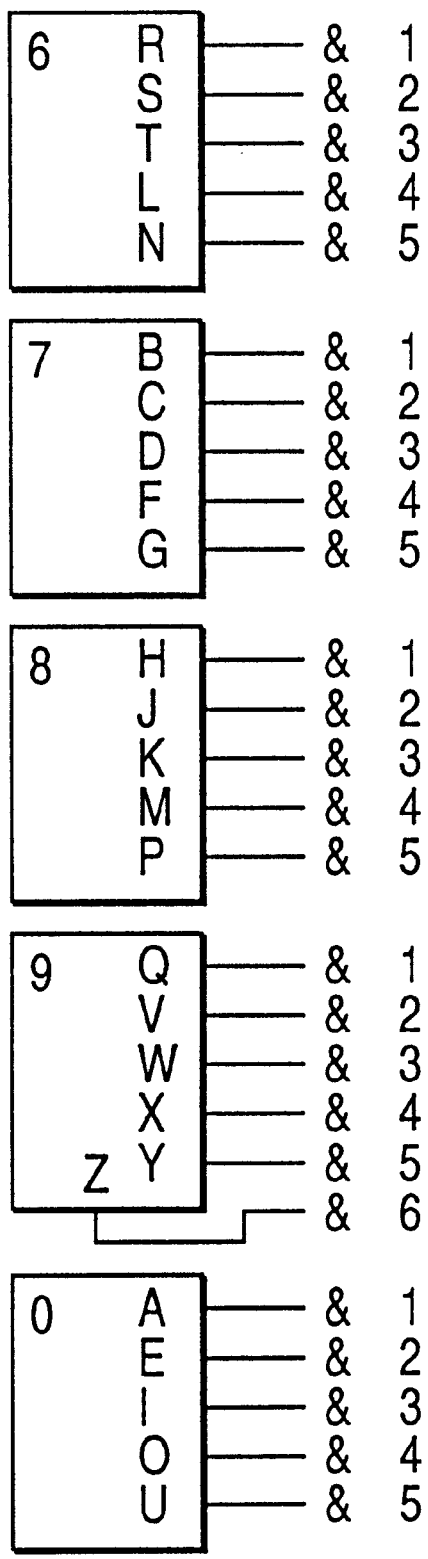

FIGS. 4 and 5 each illustrate the selection of pairs of displayed inputs to input a letter in accordance with the table of FIG. 3. In FIG. 4, each of the numerical inputs 6–0 are inputted with the numerical inputs 1–5 in pairs to select particular letters. The connecting line in FIG. 4 identifies the combined selection of inputs by either depressing keys or moving a stylus across the face of a display between the numerical inputs and the plus (+) sign in FIG. 5 illustrates the combined selection. FIGS. 4 and 5 depict the simplicity of selecting letters with only a pair of inputs with a minimum number of inputs either in the form of keys or a display.

As a result of the invention, a keyboard or a display, having far fewer inputs than used to type a full character set as conventionally encoded by ASCII, provides the input of a character set including letters, symbols and commands in addition to numerical inputs. Each of the embodiments of the invention produces individual signals which Is representative of the selection of single displayed numerical inputs and combined selection producing pairs of signals representative of the selection of two numerical inputs to input and select numerical values, and alphabetical characters, punctuation, symbols and commands.

The display of groups of consonants in association with a first group of displayed numerical values and the display of a group of vowels in association with a second group of displayed numerical values on the inputs 12 facilitates the encoding process and minimizes the number of required additional displays beyond the display of the numerical values 0–9 which must be used. As may be seen in the preferred embodiments, displayed groups of five letters, which are either groups of five consonants or the five vowels minimizes the number of additional keys which must be used to encode the 26 letters of the alphabet. This provides a simplified input display for selecting, inputting and encoding the letters of the alphabet and additional punctuation characters as illustrated in FIG. 3.

In one preferred embodiment of the invention, the encoder 18 is a conversion box containing hardware and firmware disposed between the output of a keyboard or position sensing display device of FIGS. 1 and 2, which processes the individual keystrokes or touching of numerical inputs representing numerical inputs and the combined selection of pairs of keystrokes or movement across the face of the display between pairs of inputs for selecting the input of characters, set forth in FIG. 3, which has an output 20 for direct connect to a standard PC or other device. Accordingly, no modification of PC software is necessary for this configuration. Furthermore, it should be understood when the present invention is utilized with a keypad that it is not limited to the keypad configuration of FIGS. 1 and or display content of letters and numerical values of FIGS. 1 and 2. Additional characters may be displayed with all of the embodiments of the invention with their selection being performed in an analogous way.

It should be understood that the invention is not limited to the display of FIGS. 1 and 2 and is not limited to any particular form or type of device and may be that of a calculator-type device, a telephone, a keypad utilized in association with a PC, or an application specific device.

While the invention has been described in terms of its preferred embodiments, it should be understood that numerous modifications may be made thereto without departing from the spirit and scope of the invention. It is intended that all such modifications fall within the scope of the appended claims.

We claim:

1. A system for encoding inputs comprising:

a plurality of inputs each displaying a different numerical value; some of the plurality of inputs each also displaying at least one input letter and at least one additional input each displaying at least one input not representing a numerical value or letter; each of the plurality of inputs displaying an input numerical value when selected singly producing a signal representing selection of the displayed numerical input value and each additional input when selected producing a signal representing the input selection of the displayed at least one input; different ones of the plurality of inputs displaying an input numerical value further being selected to input consonants and vowels with an input vowel being selected and inputted with one input displaying an input numerical value and another input displaying an input numerical value and the input vowel; an input consonant being selected and inputted with one input displaying an input numerical value and another input displaying an input numerical value and the selected input consonant; an input other than an input numerical value or input letter being selected with one input being one of the at least one additional inputs and another input which is one of the plurality of inputs; and an encoder, responsive to the plurality of inputs and to the at least one additional input, having an output for outputting encoded inputs including at least alphabetical and numerical characters with each selected numerical value being inputted to the encoder in response to selection of a single one of the plurality of inputs displaying a numerical value and all inputs, other than numerical values, being inputted to the encoder in response to the combined selection of inputs chosen from the plurality of inputs and the at least one additional input.

2. A system in accordance with claim 1 wherein:

one of the plurality of inputs displaying a numerical value and each of the vowels and another input displays a numerical input.

3. A system in accordance with claim 1 wherein:

each selected consonant is inputted by the combined selection of one of the plurality of inputs displaying a numerical value and one of the plurality of inputs displaying a numerical value and a plurality of consonants including the selected consonant.

4. A system in accordance with claim 2 wherein:

one of the inputs selected with the inputting of the vowels and consonants displays only a numerical value.

5. A system in accordance with claim 3 wherein:

one of the inputs selected with the inputting of the vowels and consonants displays only a numerical value.

6. A system in accordance with claim 1 wherein:

characters other than numbers, vowels and consonants are each inputted by a combined pair of inputs with one of the pair of inputs displaying a character other than a number or letter.

7. A system in accordance with claim 2 wherein:

characters other than numbers, vowels and consonants are each inputted by a combined pair of inputs with one of the pair of inputs displaying a character other than a number or letter.

8. A system in accordance with claim 3 wherein:

characters other than numbers, vowels and consonants are each inputted by a combined pair of inputs with one of the pair of inputs displaying a character other than a number or letter.

9. A system in accordance with claim 4 wherein:

characters other than numbers, vowels and consonants are each inputted by a combined pair of inputs with one of the pair of inputs displaying a character other than a number or letter.

10. A system in accordance with claim 5 wherein:

characters other than numbers, vowels and consonants are each inputted by a combined pair of inputs with one of the pair of inputs displaying a character other than a number or letter.

11. A system in accordance with claim 1 wherein:

the plurality of the inputs are located in two pairs of vertical columns spaced on each side of a centerline; and a plurality of inputs displaying at least one consonant are disposed in at least two of the columns respectively on different sides of the centerline.

12. A system in accordance with claim 1 wherein:

the plurality of inputs are disposed in a single in-line array.

13. A system in accordance with claim 2 wherein:

the plurality of inputs are disposed in a single in-line array.

14. A system in accordance with claim 3 wherein:

the plurality of inputs are disposed in a single in-line array.

15. A system in accordance with claim 4 wherein:

the plurality of inputs are disposed in a single in-line array.

16. A system in accordance with claim 5 wherein:

the plurality of inputs are disposed in a single in-line array.

17. A system in accordance with claim 6 wherein:

the plurality of inputs are disposed in a single in-line array.

18. A system in accordance with claim 7 wherein:

the plurality of inputs are disposed in a single in-line array.

19. A system in accordance with claim 8 wherein:

the plurality of inputs are disposed in a single in-line array.

20. A system in accordance with claim 9 wherein:

the plurality of inputs are disposed in a single in-line array.

21. A system in accordance with claim 10 wherein:

the plurality of inputs are disposed in a single in-line array.

22. A method of inputting characters with a plurality of inputs each displaying a different input numerical value with at least some of the plurality of inputs each additionally displaying at least one input letter and at least one additional input each displaying at least one input not representing a numerical input value or input letter comprising:

inputting a numerical value by individually selecting the numerical value displayed on one of the plurality of inputs;

selecting at least one vowel with each vowel being selected with one input displaying a numerical value and another input displaying a numerical value and the vowel; and selecting at least one consonant with each consonant being selected with one input displaying only a numerical value and another input displaying a numerical value and at least the selected consonant.

23. A method in accordance with claim 21 wherein:

one of the plurality of inputs displaying a numerical value also displays a plurality of vowels and a plurality of the plurality of inputs displaying a different numerical value each displays a plurality of different consonants.

24. A method in accordance with claim 22 further comprising:

encoding at least one input character which is neither a consonant or a vowel by combined selection of a plurality of the inputs with one of the inputs not displaying a consonant or a vowel and displaying the at least one input character which is neither a consonant or vowel.

25. A method in accordance with claim 23 further comprising:

encoding at least one input character which is neither a consonant or a vowel by combined selection of a plurality of the inputs not displaying a consonant or a vowel and displaying the at least one input character which is neither a consonant or vowel.

26. A method in accordance with claim 21 wherein:

one of the inputs selected with the inputting of the vowels and consonants displays only a numerical input value.

27. A method in accordance with claim 22 wherein:

one of the inputs selected with the inputting of the vowels and consonants displaying only a numerical input value.

28. A method in accordance with claim 23 wherein:

one of the inputs selected with the inputting of the vowels and consonants displaying only a numerical input value.

29. A method in accordance with claim 24 wherein:

one of the inputs selected with the inputting of the vowels and consonants displaying only a numerical input value.

* * * * *